(12) United States Patent
Paumen et al.

(10) Patent No.: US 7,229,656 B2
(45) Date of Patent: Jun. 12, 2007

(54) FOOD TUMBLER

(76) Inventors: Lawrence J. Paumen, deceased, late of Annandale, MN (US); Mark D. Solvie, 6403 85th St. NW., Maple Lake, MN (US) 55358; by Joyce C. Paumen, legal representative, 415-12th St., Buffalo, MN (US) 55313

( * ) Notice: Subject to any disclaimer, the term of this patent is extended or adjusted under 35 U.S.C. 154(b) by 574 days.

(21) Appl. No.: 10/237,004

(22) Filed: Sep. 7, 2002

(65) Prior Publication Data

US 2003/0085234 A1 May 8, 2003

Related U.S. Application Data

(60) Provisional application No. 60/317,785, filed on Sep. 7, 2001.

(51) Int. Cl.
*A23L 1/015* (2006.01)
*A23N 12/02* (2006.01)

(52) U.S. Cl. .................. 426/519; 426/506; 134/21; 134/25.3; 134/48; 366/139

(58) Field of Classification Search .................. None
See application file for complete search history.

(56) References Cited

U.S. PATENT DOCUMENTS

| | | | |
|---|---|---|---|
| 7,766 A | | 11/1850 | Starkweather |
| 2,597,291 A | | 5/1952 | Clegg |
| 2,616,604 A | * | 11/1952 | Folsom |
| 3,439,901 A | | 4/1969 | McCulloch |
| 3,928,634 A | | 12/1975 | Gasbarro |
| 4,201,483 A | * | 5/1980 | Franzke ................ 366/139 |
| 4,446,779 A | * | 5/1984 | Hubbard et al. ............ 99/472 |
| 4,458,586 A | | 7/1984 | Reed |
| 4,517,888 A | * | 5/1985 | Gould .................. 99/472 |
| 5,104,232 A | * | 4/1992 | Lennox, III ............... 366/227 |
| 5,603,567 A | * | 2/1997 | Peacock .................. 366/139 |
| 5,925,311 A | * | 7/1999 | Penafiel Vercher et al. .. 266/114 |
| 5,947,015 A | * | 9/1999 | Laurbak .................. 99/535 |
| 5,972,398 A | * | 10/1999 | Ludwig et al. ........... 426/281 |
| 6,040,013 A | * | 3/2000 | Karales .................. 427/281 |
| 6,105,490 A | * | 8/2000 | Horn et al. ............... 99/472 |
| 6,379,739 B1 | * | 4/2002 | Formanek et al. ......... 426/650 |
| 6,509,050 B1 | * | 1/2003 | Henson et al. ............ 426/332 |

OTHER PUBLICATIONS

Rombauer, I. S. 1997. Joy of Cooking. A Plume Book, New York, pp. 526-529.*
Desrosier, N. W. 1997. Elements of Food Technology. AVI Publishing Company, Inc., Westport, CT., p. 679.*

* cited by examiner

*Primary Examiner*—Carolyn Paden
(74) *Attorney, Agent, or Firm*—Albert W. Watkins

(57) ABSTRACT

A counter-top appliance has a food container with internal fins extending inward from the outer wall at an angle offset from radial. The food container is coupled to a motor for rotation in either of two directions. One direction of rotation produces a scooping, elevating and subsequent discharge of liquid and fluent materials such as might be useful for washing or breading, while the second direction of rotation presents a surface adapted for massaging meat during marinating. The food container is preferably sealed through vacuum, and has a simple geometry which greatly facilitates thorough cleaning of the container. Meats, produce, pasta, and other diverse foods are processed using the counter-top appliance, and a method for processing one or a sequential set of foods is disclosed.

2 Claims, 4 Drawing Sheets

FOOD TUMBLER

CROSS REFERENCE TO RELATED APPLICATIONS

This application claims priority to U.S. Provisional Application No. 60/317,785 filed Sep. 7, 2001.

BACKGROUND OF THE INVENTION

1. Field of the Invention

The present invention pertains generally to food processes and apparatus, and more specifically to a versatile countertop tumbler apparatus and an associated tumbling process. The food tumbler and tumbling process are useful to selectively marinate meat, toss salads, cleanse food, bread foods, and for other similar purposes.

2. Description of the Related Art

The processing of food has always been a labor intensive task. Nevertheless, the need to safely prepare food is of vital importance, and has historically dictated the difference between entire civilizations rising or falling. Associated with the need for safe food preparation is the desire to enable a person to readily prepare more palatable and diverse meals with a minimum of expertise or training. As a result of the importance of food preparation, and the significant impact on health or labor even relatively small improvements will have, there has been much effort devoted through the ages on this task and a great many inventions pertaining thereto.

In the area of food safety, many techniques have been researched and developed which are provided to improve the safety of the food supply. Exemplary among these are the various inspections performed by the various governmental agricultural agencies, such as the United States Department of Agriculture (USDA) designed to ensure proper handling and processing of food prior to human consumption. Proper education and training is directly associated with the resulting safety and quality of a food. While these efforts have lead to an exceptionally safe food supply in the United States with regard to pathogens, which by many is considered to be among the best ever available, there continue to be significant instances where persons are inadvertently sickened, occasionally resulting in death. Owing to the reasonable limits on manpower for food inspection and inspection of food growers, handlers and preparers, it is impossible to provide inspection and verification of all food which enters into the marketplace for consumption. Only a fraction of a percent of food grown or imported is inspected, and costs for various analytical techniques restrict the extent of these inspections. Consequently, it is desirable to have a means for easily cleansing the food prior to final preparation and consumption which will improve the safety of the food, in the event the food has not been inspected and does, in fact, contain undesired pathogens, pesticides, herbicides or other contaminants.

Safety of food extends beyond the presence of foreign contaminants, and also includes the contents of the food when prepared a particular way. One popular method of cooking meat is grilling or barbecue cooking over a flame. This cooking method has been linked to increased risks of breast, stomach and colorectal cancer, owing to the formation of heterocyclic amines (HCAs) during the cooking process. However, marinating meat before grilling has been shown to reduce the amount of HCAs formed during grilling, in some cases by as much as 92 to 99 percent. Consequently, one preferred method for improving not only the taste of flame-grilled meats but also the safety thereof is to marinate the meat prior to grilling.

Safety of prepared food is only one concern. As aforementioned, preparation time, effort and training required of the food preparer are all also very important. In other words, the need for extensive human effort and expertise during food preparation may also be prohibitive, and thus deter otherwise desired preparation. While cleansing is certainly one such step requiring preparation time, effort and training, there are many other steps in food preparation that have historically been similarly labor intensive. Exemplary is the mixing of ingredients for tossed salad, cole slaw, pasta salad and the like. These foods have traditionally been prepared entirely by hand, owing to the fragile nature of the foods and the importance of even distribution of ingredients. Preparation of such ingredients in advance is difficult or impossible, owing to the inevitable separation of ingredients that occurs over time. Breading is another step that has been manually performed for smaller quantities of foods, with machinery available only for larger food establishments and food preparation businesses. When foods are breaded substantially in advance of cooking, such as when done on a commercial basis, the food must be frozen to maintain the quality of the breading through the handling and distribution of the food. Marinating meats is another area similar to breading, where machinery has only been available for larger commercial establishments. Examples of these marinating machines are found in U.S. Pat. No. 7,766 to Starkweather; U.S. Pat. No. 3,928,634 to Gasbarro; and U.S. Pat. No. 4,458,586 to Reed. The existing equipment has not been adequate for household use, owing to a large number of issues such as safety, cost of the complex equipment, and the lack of desire by a homeowner or apartment dweller to dedicate space for a single or limited function machine.

While safety, preparation time and effort, and complexity are all important factors from a utilitarian perspective, the variety of foods and the tastes, textures, appearances and aromas of those foods also serves as a measure of the quality and desirability of the food preparation. Consequently, more foods that are easily prepared and consumed, and greater varieties of pleasing flavors, tastes and aromas imparted to those foods, are desired.

Various machines and devices have been proposed in the prior art that attempt to address one or several of these important factors associated with food preparation. For example, U.S. Pat. No. 3,081,070 to Welsch and U.S. Pat. No. 3,439,901 to McCulloch each illustrate salad mixers that are designed to tumble a salad without the squashing or bruising that is typical with hand preparation. While each of these products are novel in their design and construction, they are limited in application to lettuce and other types of salads, and both are prone to leakage and failure. Other inventions have contemplated tumbling for other food products, such as the tumble churn illustrated by Clegg in U.S. Pat. No. 2,597,291, the contents which are incorporated herein by reference with regard to the teachings of a tumbler base and drive system. While the Clegg base and motor drive system offers much benefit over other prior art techniques, the Clegg container is designed to contain milk or cream, and act as a butter churn or other tumbling, agitating or mixing container. Unfortunately, the Clegg screw cap and depending vanes are relatively limited in application, since they are neither sturdy nor designed to prevent liquids from passing between them and the outer wall. In fact, the vanes will likely, with repeated usage, be deflected away form the edge of the container wall at one end or the other. Consequently, very little if any liquid may be actually carried upon the vanes, a limitation that is very consequential as will be better understood herein below. In addition, the screw-on cap is difficult to manipulate when a chef or cook's hands are either wet or oily, conditions which are commonplace within a food preparation area. Finally, the tapered neck on the Clegg container complicates access within the container, both for food insertion and removal, and also for cleaning of the container after food preparation using the container is completed. In fact, owing to the inherent limitations, the Clegg container is limited in application to materials that are generally fluid in nature and which are also relatively homogenous. This is a common limitation of the prior art. Clearly, there is much to be desired in this vital area of food preparation that has net been adequately addressed by the prior art.

SUMMARY OF THE INVENTION

In a first manifestation, the invention is, in combination, a sealable container; a motor; and a coupler. The sealable container receives and retains foods within an outer wall. The container has at least one paddle which extends inward from the outer wall in a direction which is angularly offset from radial. The coupler transmits motion from motor to sealable container in either of a first direction of rotation which rotates the sealable container to trap liquid between paddle and outer wall above an at-rest liquid level and a second direction of rotation opposite the first direction of rotation which rotates the sealable container to discharge liquid between paddle and outer wall by the at-rest liquid level.

In a second manifestation, the invention is a household kitchen counter-top appliance adapted for the tumbling of various solid and liquid foods and food ingredients within a tumbler. The appliance has a motor for spinning said tumbler about a rotary axis. The tumbler consists essentially of a generally circular bottom; cylindrical side walls extending from bottom to an opening distal to the bottom and forming a rim adjacent the opening; and a cover engaging the rim and retained thereto solely by a pressure differential between an interior and an exterior of the tumbler.

In a third manifestation, the invention is a method of tumbling food. Food and ingredients are added to a container, and the container is covered. A vacuum apparatus is attached to the container and is used to draw a vacuum therein. A food treatment function and duration of treatment are selected. The container is coupled to a rotary drive and tumbled responsive to the selecting step. The container is opened subsequent to tumbling, and the tumbled food and ingredients are removed from the container.

OBJECTS OF THE INVENTION

Exemplary embodiments of the present invention solve inadequacies of the prior art by providing safe and easy to use apparatus and methods to marinate, toss, bread and cleanse food. A first object of the invention is to simplify the process of safely preparing food, while simultaneously improving the overall safety of the prepared food. A second object of the invention is to enable rapid and safe countertop meat marination. Another object of the present invention is to simplify the process of preparing salads of all types, and reduce the amount of time and labor required. A further object of the invention is to provide the same components in an appropriate configuration to be capable of the very diverse functions of marinating, breading, tossing, and cleansing with the need for few if any additional components. Yet another object of the present invention is to provide these aforementioned objectives through the careful design of the components, thereby reducing the number and complexity of parts, enabling reasonably priced manufacture, and simplifying the cleaning and storage of the equipment between food preparation uses.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
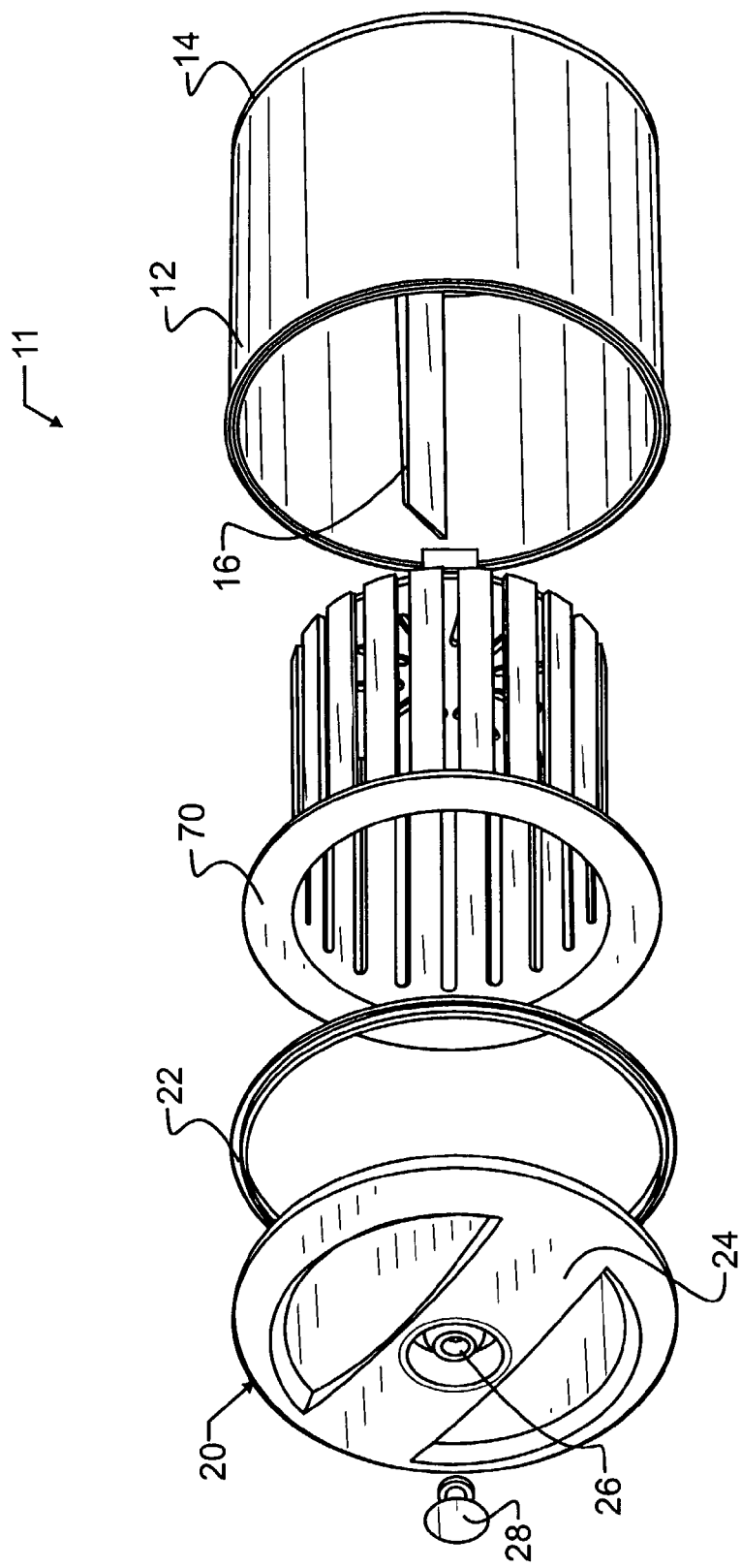
FIG. 1 illustrates a preferred embodiment tumbler container designed in accord with the present invention by exploded, projected view, and including a preferred embodiment food basket therein.
Figure 2:
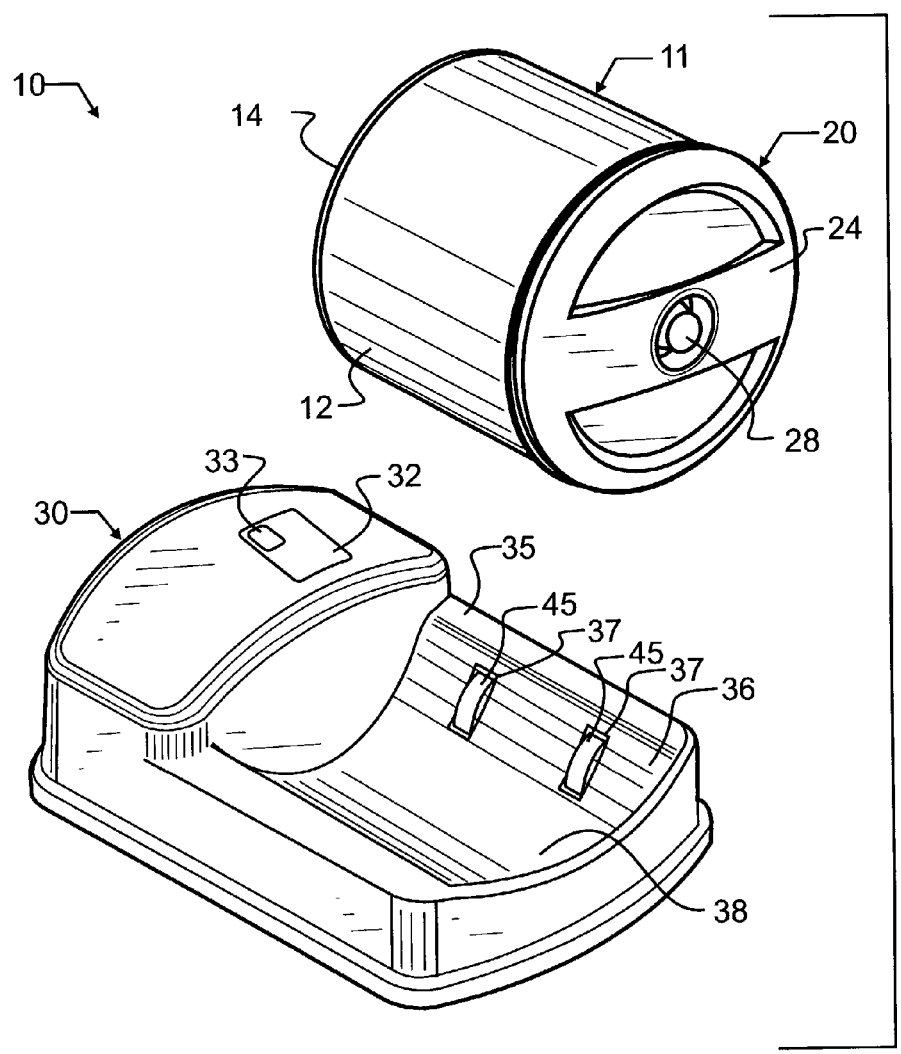
FIG. 2 illustrates a preferred embodiment tumbler base for use in combination with the preferred embodiment tumbler of FIG. 1 from a projected plan view.

Manifested in the preferred embodiment, the present invention provides flexibility of application in a readily understood and easy to use package, while still preserving both the safety of the food preparer and also the persons consuming the food. In a most preferred embodiment of the invention illustrated in FIGS. 1–3, food tumbler 10 includes a food container 11 of generally cylindrical configuration. Side walls 12, a bottom 14 and two paddles 16, 18 are most preferably formed integrally with container 11, thereby simplifying manufacture and reducing production costs. Paddles 16, 18 are most preferably formed at an angle of approximately 33 degrees from a radius line R, which enables paddles 16, 18 to form a lifting scoop in conjunction with side wall 12 when rotated in a clockwise direction as viewed in FIG. 3. The angle will preferably be between approximately twenty and sixty degrees. Too small an angle will result in a loss of fluent material lifting, while too great an angle will produce undesirably small corners and tight spaces where food residue may accumulate. Other geometries besides the relatively straight paddles illustrated are also contemplated, so long as the geometries most preferably preserve the lifting and massaging functions.

A basket 70 may optionally be used, depending upon the various foods and other ingredients being tumbled. In this preferred embodiment, basket 70 has relatively large slots 72 therein, which permit liquids or powders from outside of basket 70 but within container 11 to be distributed over food that is more gently carried within basket 70. Basket 70 is contemplated herein for use with such diverse foods as leaf vegetables, fruits, and any other fragile foods, and also for the breading of meats and vegetables, though many other applications will be apparent to those skilled in the art of food preparation.

Exterior fluent material will be exposed to the raising and dropping action of paddles 16, 18, but the contents of basket 70 will not be. Consequently, a marinade, flour or breading mix, vinegar and oil dressings, cleaning solutions or other liquids or fluent materials will be elevated and dropped through gravity into basket 70, while the contents already within basket 70 are handled more gently. Rotation of container 11 in a clockwise direction as shown in FIG. 3 scoops liquids and fluent materials for more effective washing of produce and spreading of breading mixes and the like.

Figure 3:
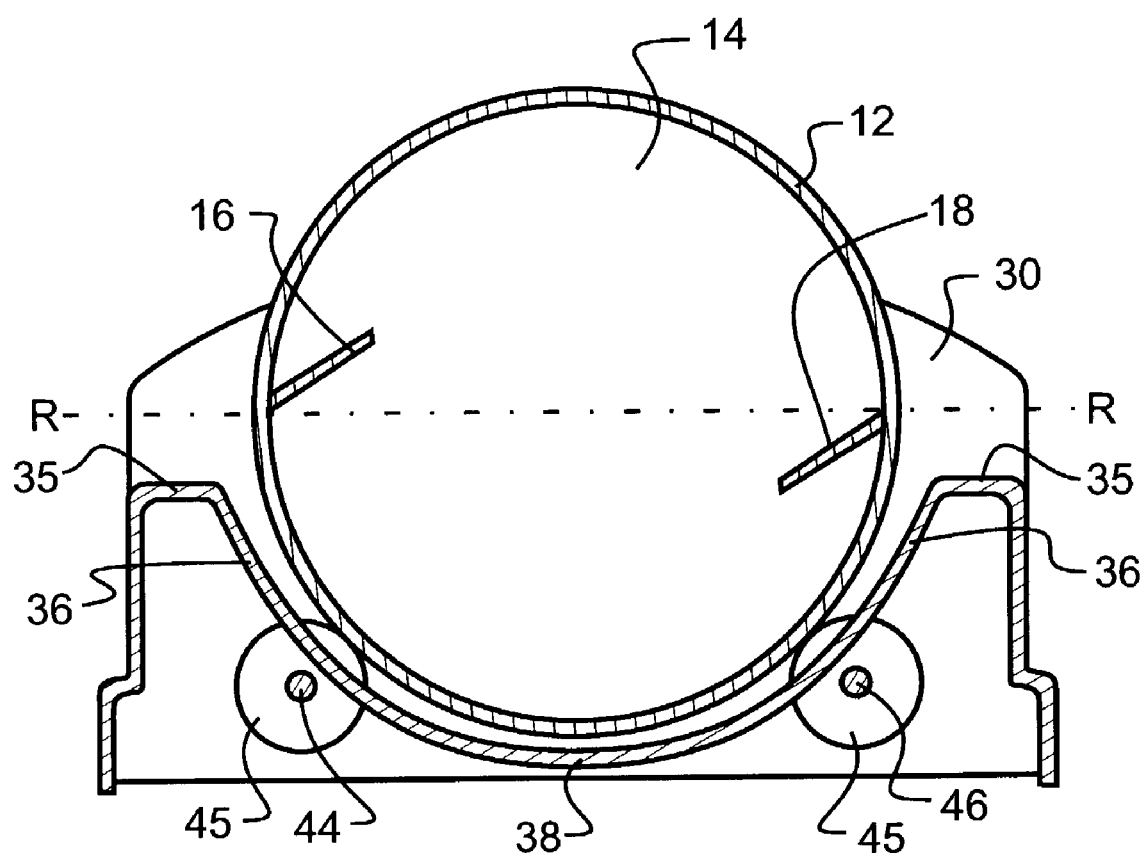
FIG. 3 illustrates a schematic cross-sectional view of the preferred embodiment tumbler and tumbler base of FIG. 2.

Rotation in a counter-clockwise direction using the orientation of FIG. 3 will most preferably be performed without basket 70 in place. This orientation of paddles 16, 18 results in a more optimum marinating of meats. Paddles 16, 18 serve in this orientation to rub or massage the meat during the tumbling, without tearing up more fragile meats or tissues. Consequently, the preferred angling of paddles 16, 18 permits container 11 to be used optimally for washing and distributing fluent or fluid materials through rotation in a first direction, and also used optimally for the marinating of meat through rotation opposite to the first direction. This reversal is achieved through the step of placing container 11 either with cover 20 adjacent to switch 33 with base 14 distal thereto for rotation in a first direction, or with cover 20 distal to switch 33 and with base 14 adjacent to switch 33 for rotation in a second direction. This arrangement eliminates the need for any special electrical or electronic circuitry or switches to reverse the direction of rollers 45, though such circuitry is a contemplated alternative herein. The ability to reverse rotation and change the action of paddles 16, 18 thereby further simplifies the construction of food tumbler 10, while extending functionality and capability of the present invention.

A cover 20 includes a mating feature 22 which cooperatively seals food container 11. This mating feature may take the form of a simple snap lip, a mating pair of threads, or a gasket 22 as shown in the preferred embodiment. Gasket 22 is appropriate where vacuum is applied, since the atmospheric pressure on the outside of cover 20 provides the forces necessary to compress gasket 22 and seal container 11. As illustrated, a vacuum seal is most preferred since the vacuum not only provides sealing force, but also speeds the processes of cleansing, coating and marinating food. A vacuum seal simultaneously simplifies closure of container 11 and the cleaning thereof after use. Cover 20 for vacuum applications will most preferably include dome 24 for strength, and will have a vacuum port 26 therein. Applications not requiring a vacuum, such as salad tumbling, will also not require dome 24 or port 26.

In the preferred embodiment tumbler 10 illustrated, port 26 includes a one-way valve such as plug 28. Plug 28 is designed to interact with features in port 26 to enable air to be withdrawn from within container 11 through port 26, but will not allow the air to return back into container 11. This may be accomplished by designing the bulb end of plug 28 to seal with the exterior edge of port 26, while grooves or other surface irregularities may be formed on the interior surface of port 26, preventing a seal between the inside flare of plug 28 and the interior of port 26. This way, when vacuum is drawn around plug 28, the exterior bulb portion of plug 28 will be drawn away from port 26, and the interior portion will not seal, allowing air to be drawn out of container 11. When vacuum is released from about plug 28, atmospheric pressure will then be greater than the pressure inside container 11, and plug 28 will be pressed against the outside of port 26, forming a seal. When container 11 is to be opened, the large exterior bulb of plug 28 may be deformed, breaking the seal with port 26 and permitting air to pass into container 11. This eliminates the vacuum seal, and allows cover 20 to be readily removed from side walls 12.

Container 11 and cover 20 are removable from tumbler 10, to simplify loading or charging container 11 with contents, and also to simplify unloading and cleaning thereof. In the preferred embodiment, container 11 and cover 20 will most preferably be dimensioned to fit within a standard household dishwasher, and to be manufactured from dishwasher-safe materials to withstand the dishwasher detergent and dishwasher temperatures. This simplifies the cleaning of container 11 after use.

Tumbler 10 also includes a base housing 30, which in the preferred embodiment encloses a motor, transmission and roller shafts 44, 46 such as illustrated in the Clegg patent incorporated herein above by reference. Various rollers 45 are supported on the shafts and driven as also illustrated in Clegg. Housing 30 which acts as a cover for the motor and transmission, while also providing a surface for a user control panel 32. In the preferred embodiment an electronic timer is used as a switch 33 that controls electric power applied to the motor. Switch 33 may take many different forms besides the electronic timer, including but not limited to rotary timer switches, simple on-off switches, rotary speed controls, various electronic keypads and touch panels, and other known user interfaces.

In order to allow cooling of transmission and motor, passive vents may also be provided in housing 30, though vents are less preferred owing to the possibility for food or liquids to pass therein and not be removed by an operator. Where appropriate, those skilled in the art may add such features as cooling fans and the like. For the present preferred embodiment however, simpler design and construction are preferred in order to keep the manufactured costs relatively lower, thereby enabling more persons to afford the opportunity to acquire and use the present invention.

Housing 30 most preferably also includes a border 35 which is preferably somewhat lower than control panel 32. Extending from an inner edge of border 35 is a wall 36 having slots 37 formed therein. Through slots 37 rollers 45 pass for engagement with container side wall 12. Rollers 45 are spaced apart sufficiently to cradle container 11 therein along two horizontal lines, and housing 30 acts as a further retainer along two additional horizontal lines transverse to container 11. Consequently, container 11 will nest into rollers 45, and be driven thereby. The slope of wall 36 is preferred to direct any liquids that may have been spilled from or onto an exterior of container 11 during loading to settle in central lower region 38 for easy subsequent cleaning. Alternatively, central lower region 38 may be provided with a drain and liquid collection device, the exact construction which will be decided by the designer.

Figure 4:
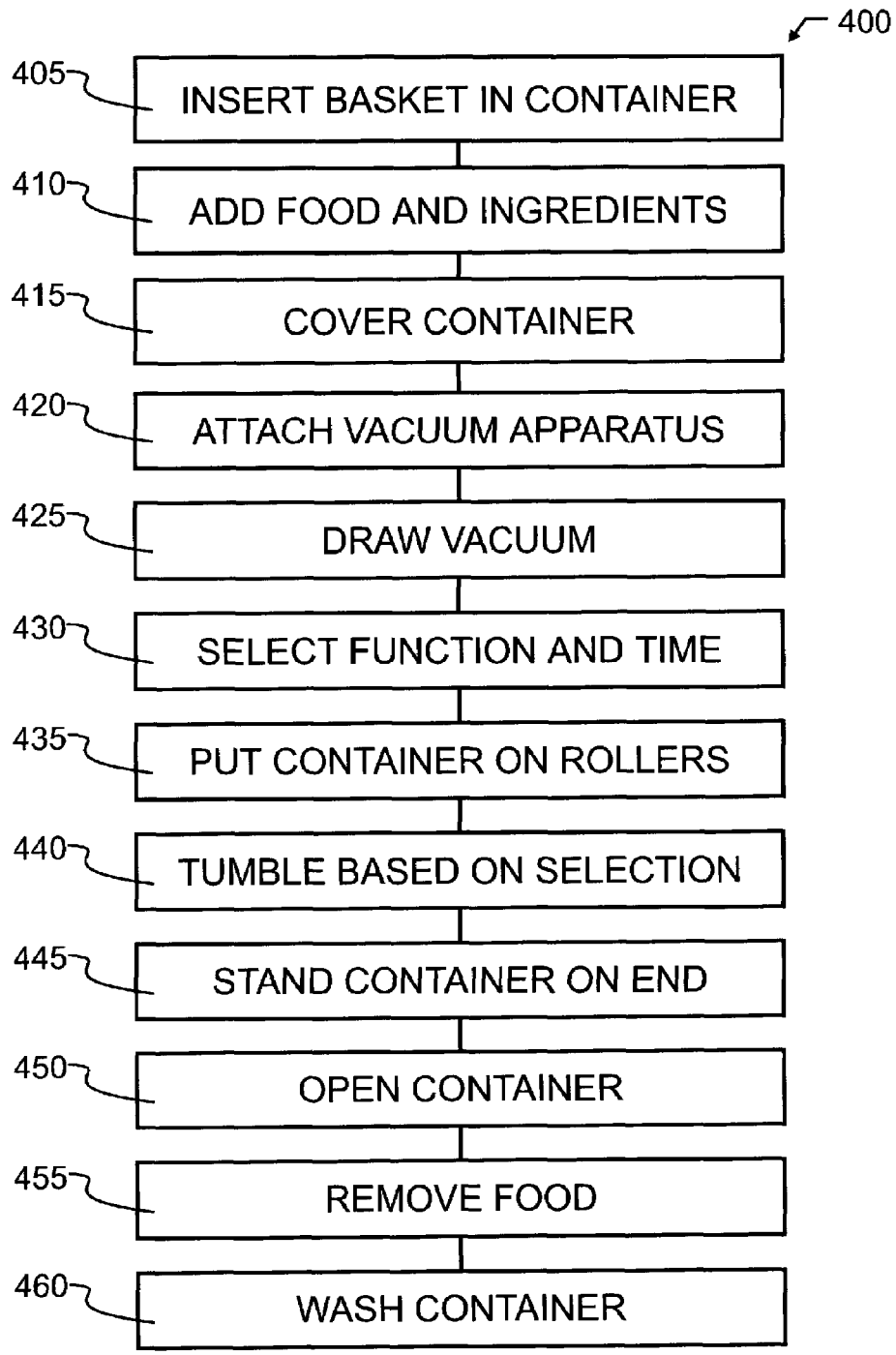
FIG. 4 illustrates a preferred embodiment method of food preparation which incorporates many of the advantages and objectives of the present invention.

According to the preferred food tumbling method 400, a user will begin the preparation for a meal by selecting food and various additional ingredients. In the present example, this may for exemplary purposes include preparing a marinade, and gathering a meat of choice. The meat and marinade will be placed within container 11 as shown in FIG. 4 at step 410 of tumbling process 400, and cover 20 will be placed thereon as shown at step 415. A vacuum apparatus is then most preferably attached to port 26 as shown at step 420, and a vacuum is drawn at step 425. A variety of techniques for drawing and retaining a vacuum within a container are known in the food industry, and the details thereof are not important to the present invention. However, various appliances are known that may be used, either through continuous attachment, or by application and removal. Such devices include both manual and electrically powered pumps, including battery powered devices. If the vacuum is applied only once prior to the start of tumbling, which is the preferred embodiment, port 26 will require a valve mechanism such as plug 28, a flapper valve, or the like to permit air to be withdrawn, while not permitting liquids to escape during tumbling.

The tumbling function and appropriate time are preferably determined as shown at step 430. In the preferred embodiment, control panel 32 will be imprinted with a basic time chart for various food treatments and foods. Additionally, the orientation of container 11 with respect to housing 30 will need to be determined, to select whether meats are to be massaged or fluent materials to be lifted by paddles 16, 18. Container 11 is next placed upon rollers 45 within base 30 as shown at step 435, and switch 33 is activated to begin tumbling the meat within marinade at step 440. This tumbling will most preferably be based upon the selections made at step 430, and will be regulated by a timer or the like. This process will typically require only about fifteen minutes for most meats to marinate, during which time the user may prepare lettuce, pasta, or other ingredients for a salad. When the meat within container 11 has been sufficiently marinated, and this may involve the absorption of from as little as desired to forty percent or more by weight of marinade, container 11 will be removed from housing 30 and stood on bottom 14 as shown at step 445. Container 11 will be opened next, as shown at step 450. In the preferred embodiment, opening container 11 comprises flexing the external bulb on plug 28 to break the vacuum seal. The food within container 11, in this example the meat, will be removed at step 455. Finally, container 11 and cover 20 are washed at step 460 and are thereby prepared for the next use.

This tumbling process 400 may be repeated while the marinated meat is being cooked. For exemplary purposes, a salad may be prepared while the meat is cooking. In this case, step 405 will be included, which involves inserting basket 70 within container 11. Lettuce leaves and other parts of the salad that need washed or sanitized will most preferably be added at step 410. In addition, the cleaning and sanitizing liquid will most preferably be added. Most preferably, this liquid will comprise a vinegar and water mixture having approximately one and one-quarter percent by volume acetic acid concentration. The container 11 will be covered and vacuumed as in steps 415–425, and the function will be selected to orient paddles 16, 18 for lifting liquid, which is the clockwise rotation from the view of FIG. 3. As may be seen in FIG. 3, if line RR is a horizontal line dividing container 11 into two equal halves, the angle of paddles 16, 18 will ensure that liquid is carried above line RR and dropped at some point thereafter. This allows the liquid to be dispensed across a larger area of the tumbler, and allows gravitational forces to accelerate the liquid to further assist in the cleaning function.

When container 11 has been sufficiently tumbled as shown at step 440, container 11 will be removed from housing 30 and stood on end. The food which has been cleaned and sanitized maybe lifted out of container 11 within basket 70, and rinsed with fresh water within basket 70 as well. The fresh water rinse is preferred to remove any vinegar taste or residue, though this rinsing is not essential to the operation of the invention. At this point, the salad greens have been cleaned and sanitized.

By way of example, the tumbling process of sanitizing has been demonstrated to be highly effective on ordinary retail produce, as the following examples illustrate. In the following examples, reverse osmosis (RO) purified water was used as a control treatment and compared against both ozonated RO water and the preferred vinegar and water solution described herein above of one and one-quarter percent by volume acetic acid. Microbial analyses were performed on the various rinse solutions, and plate counts were performed using 3M brand Petrifilm. Aerobic Count Plates (ACP) estimate total aerobic spoilage bacteria. Coliform and *E. Coli* were measured, and are commonly used as indicators for the possible presence of fecal pathogens Yeast and mold counts measure the numbers of these respective types of spoilage micro-organisms that are present. The following percentage reductions in plate counts are calculated with reference to the control rinse solutions described above. Noteworthy is the fact that ozone, vinegar, ultraviolet light, and other antimicrobials may all be used as sterilizing compounds.

EXAMPLE 1

Alfalfa sprouts purchased at a grocery store were tumbled for 3 minutes. In addition to a control group tumbled with RO water as described above, a second group was tumbled with ozonated RO water which was ozonated using a Water Pik brand ozonator. A third group was tumbled with the vinegar and water solution:

| Rinse | ACP | Coliform | E. Coli | Yeast | Mold |
| --- | --- | --- | --- | --- | --- |
| Ozonated RO | 24.14% | 75% | Not measured | 6.25% | 200% |
| Vinegar RO | >98.28% | >99.98% | Not measured | 97.5% | >99.95% |

EXAMPLE 2

Mushrooms purchased at a grocery store were tumbled for 3 minutes. In addition to a control group tumbled with RO water as described above, a second group was tumbled with ozonated RO water which was ozonated using a Water Pik brand ozonator. A third group was tumbled with the vinegar and water solution:

| Rinse | ACP | Coliform | E. Coli | Yeast | Mold |
| --- | --- | --- | --- | --- | --- |
| Ozonated RO | 30.77% | 0% | 400% | 45.16% | 1,566.67% |
| Vinegar RO | >99.85% | >96.7% | >75% | 98.35% | 83.33% |

EXAMPLE 3

Raspberries purchased at a grocery store were tumbled for one and one-half minutes using RO water for control. In addition to a control group tumbled with RO water, a second group was tumbled with the vinegar and water solution:

| Rinse | ACP | Coliform | E. Coli | Yeast | Mold |
| --- | --- | --- | --- | --- | --- |
| Vinegar RO | >95% | >67% | Not measured | 99.67% | >99.92% |

These examples demonstrate that the preferred tumbling method removes harmful pathogens, resulting in increased levels of pathogens in the RO water control groups. The addition of vinegar to the RO water serves to additionally sanitize the food against a broad spectrum of pathogens, as evidenced by the destruction of the pathogens relative to plain RO water.

When the sanitizing tumbling process described above is completed, tumbling process 400 may be repeated yet again. This time, tumbling process 400 may be used to toss all of the salad ingredients at once within container 11. Basket 70 will preferably be inserted into container 11. Salad ingredients are then added to container 11, including vinegar, oil, spices or other dressings at step 410. Cover 20 will once again be placed, vacuum drawn to seal container 11, the function and time selected, and container 11 nested once more within base 30 at steps 415, 420, 425, 430 and 435 respectively. Switch 33 is again activated at step 440, this time typically for a much shorter duration, and the salad ingredients will be thoroughly mixed. While this is but one of many methods for practicing the present invention, it is apparent that food tumbler 10 may be used for a variety of diverse food preparation processes, even within the same meal.

The most preferred materials for container 11, cover 20, and housing 30 are plastic resins, which may or may not include various reinforcing fibers or particles, and other ingredients known to enhance the properties of the composition and resulting product. The resins will most preferably be food grade, and be accompanied by low cost and ready manufacture to custom geometries. Nevertheless, other food grade materials may be used, including but not limited to various steels, brass, glass and the like. Where preferred, additional containers may be provided, and various colors may be imparted into the different containers 11 that have significance regarding the contents of the particular container. For example, where ultimate food safety is a concern, one container may be provided for meat tumbling of a first color, while a second, differently colored container maybe used for produce. The components may be opaque, transparent or translucent, and may alternatively include a design or label that identifies the purpose of the container.

The most preferred embodiment food tumbler 10, by way of illustration but not limiting thereto, has a container 11 that measures approximately seven and one-half inches in inside diameter and seven inches in length. The diameter of container 11 will preferably be in a range from approximately four to twenty inches in diameter. Too small of a diameter reduces the washing effect, while too large a diameter makes the machine physically too large for the intended purpose. Performance issues are also introduced. Paddles 16, 18 extend approximately one and one-quarter inches from the inner surface of walls 12 towards the center-most edge thereof, though these may vary in accord with the overall size of container 11. Basket 70 has an inside diameter of approximately five inches, of course sized to nest within container 11. Container 11 when powered most preferably completes between approximately 20 and 25 rotations per minute (RPM), and preferably will operate within a range of approximately ten and forty RPM. Too slow a rotation will not move liquid or fluent components effectively, while too fast a rotation will result in undesirable centrifuging of the food within container 11. Using these preferred dimensions and rotational speeds, grocery chicken, beef and pork are most preferably tumbled for between fifteen and twenty minutes to adequately marinate, with a range extending between zero and forty minutes. Less-than-preferred tumbling time reduces the amount of marinade absorbed into the animal flesh, while longer-than-preferred tumbling time excessively breaks down the tissue. The preferred container is sized to conveniently hold up to four pounds of meat and one pound of marinade, and will consequently increase the total weight of the meat by one quarter, from four to five pounds.

Produce washing is dependent upon the hardness or softness of the fruit or vegetable being washed. For soft fruits including strawberries, raspberries and the like, only one to two minutes of tumbling is adequate. For typical vegetables and firmer fruits such as mushrooms, alfalfa sprouts and the like, three to five minutes of tumbling is most preferred. Shorter times limit the amount of cleaning, while longer durations may damage the produce. The various diameters, dimensions and rates of rotation may be optimized for one or more applications in light of the present disclosure, as will be apparent to those skilled in the art.

The invention may reasonably be extended through the addition of other components. Among those contemplated, but not limited thereto, are additional cleansing structures arranged at the inner surface of walls 12. These may most preferably take the form of non-woven cleaning pads sold under the trademark "Scotch-Brite" by 3M Corporation of St. Paul, Minn., USA, though other pads, bristles or similar known cleaning surfaces may be used with the present invention. The placement of these additional cleaning structures about the perimeter of container 11 enhances the efficacy of cleaning the more difficult to clean foods, such as root vegetables and the like, and in some instances may provide additional cushioning for the produce.

Another extension is the inclusion of cooling packs around the perimeter of container 11. A cooling pad offers the ability to either simply chill a food, or convert it into a phase-changed state such as ice-cream or the like. This type of pad may be rigid or pliable, and will preferably be stored in the freezer. Suitable compounds will most preferable undergo a very endothermic phase-change to most efficiently cool the contents of container 11.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

We claim:

1. A method of tumbling food comprising the steps of:
   adding food and ingredients to a container;
   covering said container;
   attaching a vacuum apparatus to said container and drawing a vacuum therein;
   selecting a food treatment function and duration of treatment;
   coupling said container to a rotary drive;
   inserting a mechanical cleansing structure on an internal periphery of said container; tumbling said container responsive to said selecting step and subsequent to said inserting step;
   opening said container subsequent to said tumbling; and
   removing tumbled food and ingredients from said container.

2. The method of tumbling food of claim 1, wherein said step of inserting a mechanical cleansing structure further comprises the step of inserting at least one non-woven cleaning pad.

* * * * *